(12) United States Patent
Pavarin et al.

(10) Patent No.: US 12,270,359 B2
(45) Date of Patent: Apr. 8, 2025

(54) TANK FOR CONTAINING A COMPONENT FLUID, SUCH AS A PROPELLANT

(71) Applicant: Technology for Propulsion and Innovation S.p.A., Padua (IT)

(72) Inventors: Daniele Pavarin, Padua (IT); Nicolas Bellomo, Padua (IT); Riccardo Mantellato, Padua (IT); Marco Manente, Padua (IT); Fabio Trezzolani, Verona (IT)

(73) Assignee: TECHNOLOGY FOR PROPULSION AND INNOVATION S.P.A., Padua (IT)

( * ) Notice: Subject to any disclaimer, the term of this patent is extended or adjusted under 35 U.S.C. 154(b) by 603 days.

(21) Appl. No.: 17/618,231

(22) PCT Filed: Jun. 9, 2020

(86) PCT No.: PCT/IB2020/055417
§ 371 (c)(1),
(2) Date: Dec. 10, 2021

(87) PCT Pub. No.: WO2020/250131
PCT Pub. Date: Dec. 17, 2020

(65) Prior Publication Data
US 2022/0260039 A1    Aug. 18, 2022

(30) Foreign Application Priority Data
Jun. 11, 2019 (IT) .......................... 102019000008673

(51) Int. Cl.
*F02K 9/60* (2006.01)
*F17C 13/00* (2006.01)
*B64G 1/40* (2006.01)

(52) U.S. Cl.
CPC .............. *F02K 9/605* (2013.01); *F17C 13/00* (2013.01); *B64G 1/402* (2013.01); *B64G 1/4021* (2023.08); *F17C 2227/03* (2013.01)

(58) Field of Classification Search
CPC ...... B64G 1/402; B64G 1/4021; B64G 1/413; F02K 9/605; F17C 13/00; F17C 2227/03; F03H 1/0012
See application file for complete search history.

(56) References Cited

U.S. PATENT DOCUMENTS

| 5,209,115 A | * | 5/1993 | Bond | ..................... G01F 23/246 392/458 |
| 8,610,356 B2 | * | 12/2013 | Szabo, Jr. | .............. B64G 1/413 315/111.41 |
| 2013/0026920 A1 | | 1/2013 | Szabo, Jr. et al. | |

FOREIGN PATENT DOCUMENTS

| EP | 3133283 A1 | 2/2017 |
| WO | 2015031450 A1 | 3/2015 |

OTHER PUBLICATIONS

International Search Report for PCT/IB2020/055417 dated Dec. 15, 2020 (5 pages).

(Continued)

*Primary Examiner* — Kyle Robert Thomas
(74) *Attorney, Agent, or Firm* — Tutunjian & Bitetto, P.C.

(57) ABSTRACT

The present invention relates to a tank for containing a component fluid or a mixture of components.

21 Claims, 7 Drawing Sheets

(56) References Cited

OTHER PUBLICATIONS

Written Opinion for PCT/IB2020/055417 dated Dec. 15, 2020 (9 pages).
Polzin et al., "Propulsion System Development for the Iodine Satellite (iSat) Demonstration Mission", In International Symposium on Space Technology and Sciences (ISTS) Jul. 6, 2015 (No. IEPC-2015-09), pp. 1-14.

* cited by examiner

TANK FOR CONTAINING A COMPONENT FLUID, SUCH AS A PROPELLANT

TECHNICAL FIELD OF THE INVENTION

The present invention relates to a tank for containing a component fluid or a mixture of components, such as a propellant fluid, which is liquid, solid or gaseous for engines, as well as a supply unit for an engine.

STATE OF THE PRIOR ART

Many tanks for component fluids have been proposed, including clearly propellant tanks. Among the propellants, iodine, used to supply aerospace vehicles, is of particular interest.

In this regard, iodine has a triple point phase diagram and it is loaded into the tanks proposed so far at room temperature, at which the iodine is solid. Subsequently, by heating the iodine from about 80° C.-90° C., sublimation begins, thereby obtaining the gas.

Moreover, plasma, obtained by means of special devices starting from iodine in the gaseous state, is often used for supplying aerospace vehicles.

The iodine flow rate must therefore be adjusted according to the needs of the engine.

It is also necessary to keep iodine in the gaseous state in the transfer ducts from the tank to the engine, since if the iodine were to condense, this would cause an obstruction of the ducts which, in particular when a vehicle is in flight, would cause the engine to shut down with ruinous consequences.

SUMMARY OF THE INVENTION

An object of the present invention is to provide a new tank for containing a component fluid or a mixture of components, such as an engine propellant fluid, if desired a liquid, solid or gaseous propellant, for example iodine.

Another object of the present invention is to provide a tank for delivering gas, for example of iodine in the gaseous state to engines for the production of plasma, if desired for supplying aerospace vehicles.

Another object of the present invention is to provide a tank as indicated above which guarantees reliable and simple to be adjusted control of the gas flow rate at the outlet and which is also cheaper than the solutions proposed so far.

Another object of the present invention is to provide a tank as indicated above which is simple to manufacture also with 3D printing techniques or with other manufacturing techniques.

Another object of the present invention is to provide a new engine supply unit, for example for propulsion of a vehicle or aerospace medium.

Another object of the present invention is to provide a supply unit as indicated above, which, in addition to guaranteeing a reliable and simple control of the output gas flow rate to be transformed into plasma, is able to absorb or dampen any peaks of pressure or any pressure drop in the supply gas.

Another object of the invention is to provide a unit as mentioned above in which controlled flow rate of outgoing gas is ensured, without the need to use active control elements, such as for example actively controlled valves.

Another object of the present invention is to provide a supply unit as mentioned above, which is capable of ensuring an appropriate activation of a respective engine.

Another object of the present invention is to provide a new propulsion group for a vehicle, in particular an aerospace vehicle.

Another object of the invention is to ensure uniform heating of the iodine throughout the entire operating life of the system, therefore from the condition of complete filling until the condition of complete emptying.

In accordance with an aspect of the invention, a tank according to the present application is provided.

The present application refers to preferred and advantageous embodiments of the invention.

BRIEF DESCRIPTION OF THE DRAWINGS

Other characteristics and advantages of the invention will be more evident from the description of an embodiment of a tank, a unit and a propulsion group, illustrated only by way of example in the accompanying drawings in which.

In the attached drawings equal parts or components are marked by the same reference numbers.

DETAILED DESCRIPTION OF THE INVENTION

With reference first to the attached figures, a tank 1 according to the present invention has been illustrated for containing a component fluid or a mixture of components, such as an engine propellant fluid, which is liquid, solid or gaseous. The propellant fluid can comprise iodine, for example for supplying a vehicle or aerospace means.

In particular, a tank according to the present invention is designed to supply gas, for example iodine in the gaseous state to engines for the production of plasma, if desired for supplying aerospace vehicles.

The tank 1 can comprise a first main wall or first portion of wall 2, a second main wall or second portion of wall 3. If desired, at least one side wall 4 is also provided for bridge connection between the first main wall 2 and the second main wall 3.

The walls 2, 3 and 4 delimit at least one housing area 5 of the component or mixture of components. In this regard, the walls 2, 3 and/or 4 are constrained to each other, if desired welded, screwed, bolted or made in a single piece, for example by 3D printing or molding in general, so as to be fluid-tight at the respective constraint edges. Clearly, the walls do not have holes or openings, except at one or more respective points specifically provided for the passage of the component fluid from the tank to components downstream of a respective supply unit, such as a connecting component which will be described later.

According to the non-limiting embodiment shown in the figures, the walls 2 and 3 have a square or rectangular base, while four side walls 4 are provided, each for bridge connection between a respective side of the first main wall 2 and one side of the second main wall 3. Clearly, the walls 2 and 3 could also have a different configuration.

If desired, the walls 2, 3 are substantially flat and parallel to each other.

The second main wall or second wall portion 3 delimits or defines the outlet 3a of the component fluid from the tank 1, while the first main wall or first wall portion 2 is distal from the outlet with respect to the second main wall or second wall portion 3.

The tank 1 is then also provided with first heating means 6 of the first wall 2 and second heating means 7 of the second wall 3.

The heating means 6, 7 could include heating plates, for example comprising a sandwich including two sheets or sheets of kapton with a circuit deposited in Inconel® in the middle. Such plates can also be very thin, even 50 microns. Of course, other suitable heating means can also be provided.

The heating means 6, 7 are powered for example with an electric cable, but, if desired, also with other modes, such as Wi-Fi.

Clearly, the heating means 6, 7 are constrained, for example glued to the first 2 and to the second 3 wall of the tank 1.

The tank 1 is then provided with or associated with at least one controller means 8 of the flow rate of the component fluid, if desired iodine leaving the tank 1

The at least one controller means 8 could comprise a sensor designed to directly or indirectly detect the flow rate of the component fluid leaving the tank 1. In this regard, the controller means can comprise one or more pressure or temperature sensors 8. The sensors can be used, if necessary, in combination or individually.

This sensor 8 can be mounted at the outlet of tank 1 or, if desired, also on a component or duct 9 which protrudes from outlet 3 a of tank 1.

Alternatively or additionally, temperature sensors could also be integrated into the heating means 6, 7.

The tank 1 then comprises a control unit CU designed to operate the heating means 6, 7 so as to keep the first wall 2 at a temperature lower than the second wall 3, the control unit CU being designed to receive the signals of the controller means 8 and consequently controlling the heating means 6, 7 so as to increase, decrease or keep constant the temperature difference between the first wall 2 and the second wall 3 depending on whether the flow rate of the component fluid evaluated or obtained by the control unit CU as a function of the signals received by the controller means 8 is respectively lower, greater than or equal to a given value or range of values.

Advantageously, the control unit CU sets the heating means 7 so as to obtain a temperature at the second wall 3 which is very high or in any case much higher, at least between 10° C. and 30° C. higher, of the first wall 2 and therefore it acts on the heating means 6 to raise or lower the temperature only of the first wall 2 to consequently adjust, if necessary, the flow rate of component fluid leaving the tank 1.

If the component fluid is iodine, then the temperature of the second wall 3 could be between 110° C.-120° C., if desired between 110° C. and 120° C., while the temperature of the first wall would be maintained or varied between 80° C. and 95° C. The delivery pressure of the iodine in the gaseous state could in this case be approximately 37 millibar.

Actually, the CU unit is arranged to maintain a positive temperature gradient between the bottom or first wall 2 and the head or second wall 3 of the tank 1, since the temperature must always increase from the first to the second wall 3 and, as will also be said in the following, from the first wall 2 to the outlet of the supply unit to an engine, otherwise, this in particular if the component fluid was iodine, there would be the risk of condensation or recondensation of the iodine with clog of the orifices present on the line.

Each inlet temperature or in any case applied to the first wall 2, will be connected to the outlet pressure from tank 1, as established by Antoine's equation: $\log P° = A - B/(C+T)$ The CU unit, on the base of the pressure values received by the sensor 8, varies, if necessary, the temperature of the heating means, if desired only the first heating means 6 according to any suitable control, for example proportional-derivative.

Preferably, the flow rate of the component fluid leaving the tank 1 is controlled only thanks to the action of the heating means 6, 7 or only of the first heating means 6.

The mass flow rate is therefore checked only by checking and adjusting the temperature of the walls or wall 2 of tank 1.

In this case, if the component fluid was iodine, it is loaded in the solid state and must be caused to sublimate to obtain gas to be transformed into plasma, so that the wall which will preferably control iodine sublimation will advantageously be the first 2, i.e. the less hot one.

In this regard, in the case of iodine, it has been verified that if the walls 2 and 3 are heated as above, the iodine will gradually compact or solidify on the first wall 2 and then its sublimation will be determined according to the temperature of the walls 2, 3, in particular of the wall 2.

If desired, the tank 1 can also comprise uprights 11, extending from the edges of the same in the direction of moving away from the first wall 2, for a reason which will be discussed later.

The tank 1 can also be provided with homogenization means 10 (see in particular FIGS. 4 to 7) of the temperature in the housing area 5, which means 10 are designed to improve the transfer of the thermal energy between the first wall 2 or rather the internal face 2a of the same and the component fluid, such as iodine within the housing area 5 of the tank 1. The homogenization means of the temperature also serve to ensure uniform heating of the iodine during all the operating phases starting from the condition of complete filling to the condition of complete emptying of the tank.

The homogenization means 10 of the temperature can include for example lamellae, projections, thermal contactors or protrusions distributed within the housing area 5.

The projections or protrusions 10 can extend from the first wall 2, if desired being welded thereto or in one piece with the same.

Alternatively, the projections or protrusions 10 can be distributed or scattered within the housing area 5, without necessarily being in contact with the first wall 2. In this case, the projections or protrusions, for example metal shavings, would not be welded to the first wall 2, but placed in a loose configuration (therefore not constrained and free to move) inside the housing area 5 of the tank 1.

Advantageously, the lamellae or protrusions 10 are distributed according to a lattice or latex structure.

With reference to the non-limiting example of embodiment shown in the figures, the lamellae or protrusions 10 are distributed according to a configuration that includes a plurality of nodes 10a, 10b, 10c at which respective lamellae or protrusions 10 are joined.

If desired, the lamellae or protrusions 10 are distributed according to a double tetrahedron configuration. In this case, in the sense from the second wall 3 towards the first wall 2, a first row or plurality of end nodes 10a is provided from which four lamellae 10 depart towards the first wall 2, two, three or more rows or pluralities of intermediate nodes 10b from each of which four lamellae 10 depart towards the nodes of the first row 10a and four blades 10 towards the second wall 3, and a second row or plurality of end nodes 10c from which four lamellae 10 depart towards the intermediate nodes 10b.

This structure guarantees a sufficiently distributed lattice so as to uniform the temperature in the housing area 5 with a small mass and therefore good lightness of the lamellae or protrusions 10.

Clearly, gaps 10e are delimited between the lamellae or protrusions 10 for the component fluid, if desired iodine, so that they are not packed together.

In particular, with iodine as a component fluid, the presence of the lamellae or protrusions 10 is important, since the iodine is strongly insulating, so it would isolate the temperature transfer between the walls 2, 3 or the respective internal faces 2a, 3d and the housing area 5, while the lamellae or protrusions 10 would improve the distribution of the temperature in the housing area 5 and therefore of the iodine inside the same.

Clearly, the internal faces 2a. 3d of the walls 2, 3 are the faces of the latter inside the tank 1 and delimiting the housing area 5.

The lamellae or protrusions 10 are also used to crush any pieces of solid iodine that should float within the housing area. This of course can occur in particular if the tank 1 is in a vehicle in space and therefore in the absence of gravity or micro gravity.

Preferably, the projections or protrusions 10 are not in contact with the second wall 3 or in any case are in contact with an area of the second wall 3 of less than 10%, 20% or 30% of the extension thereof or of the respective internal face 3d. This ensures that the temperature difference between the two walls 2, 3 is maintained.

In this regard, it is possible to provide an edge or perimeter area in which projections or protrusions 10d are provided, if desired configured as a column, which extend from the first 2 to the second 3 wall and which, actually, support the second wall 3.

With reference to this aspect, the second wall 3 could comprise a perimeter part 3b in a single piece with the first wall 2 and a removable lid part 3c, which acts as a removable lid for the tank 1. In this case, clearly, the perimeter part 3b could constitute an annular part for the abutment of the removable lid part 3c or the perimeter part 3b could comprise an internal shoulder for the abutment of the part 3c. Clearly, this structure could alternatively be provided for the first wall 2.

The removable lid part 3c could be attached to the perimeter part 3b or in any case to the remaining components of the tank 1 by any suitable method, for example by means of screws or bolts or glue, if desired with interposition of suitable gaskets.

In this case, a spacing or support elements 10d could be provided, if desired column-shaped in the perimeter part 5a of the housing area 5 and the projections or protrusions 10 in the central part 5b of the housing area 5, with the spacing elements 10d extending between the first wall 2 and the perimeter part 3b, while the projections or protrusions 10 extend from the first wall 2, but are not directly in contact with the second wall 3, i.e. that a respective end distal from the first wall 2 does not touch the second wall 3 or better a central or intermediate part 3cl of the removable lid part 3c. Clearly, the removable lid part 3c would also include a lateral part 3c2 resting or intended to be placed, in the closed condition of the tank 1, on the perimeter part 3b or on part of the latter, for example a shoulder 3b 1.

This arrangement would allow to print the wall 2 and the wall 3 or rather the wall 2 and the perimeter part 3b in one piece also in 3D, even with the direct laser sintering of metals or DMLS technique, which technique clearly does not make it possible to print undercut portions unless precautions, such as the spacing elements or support 10d, are provided.

In order to load the tank 1 with iodine, one can simply load the solid iodine, or a plate with a hole can be applied to the tank, at which hole a tubular connector is connected in fluid communication with a scale support where iodine is placed. Subsequently, the tubular connector is heated, the support is heated and the iodine fumes are sucked with re-condensation on the bottom of the tank and finally the tank is closed.

Figure 1:
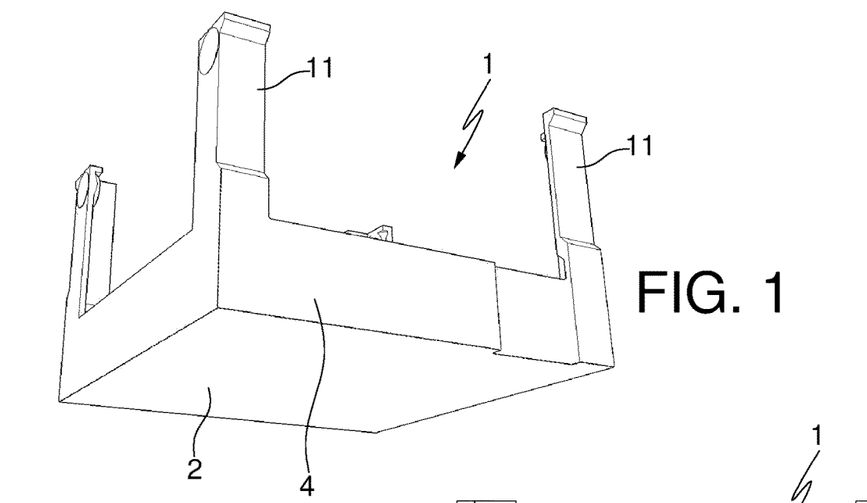
FIG. 1 is a perspective view slightly from below of a tank according to the present invention.
Figure 2:
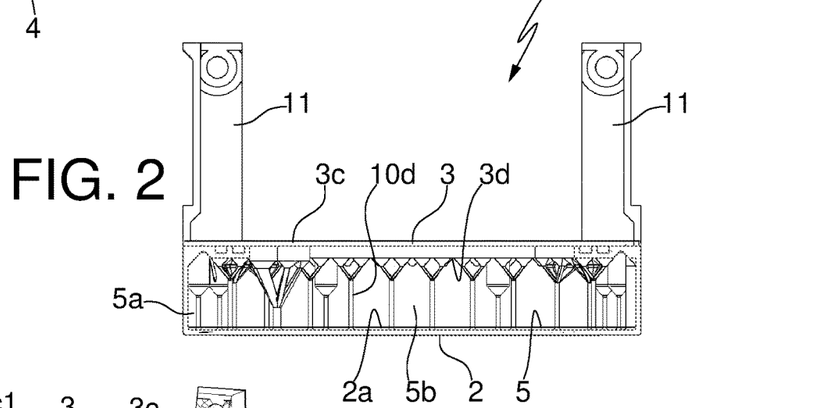
FIG. 2 is a side view of the tank of FIG. 1 with parts in transparency.
Figure 3:
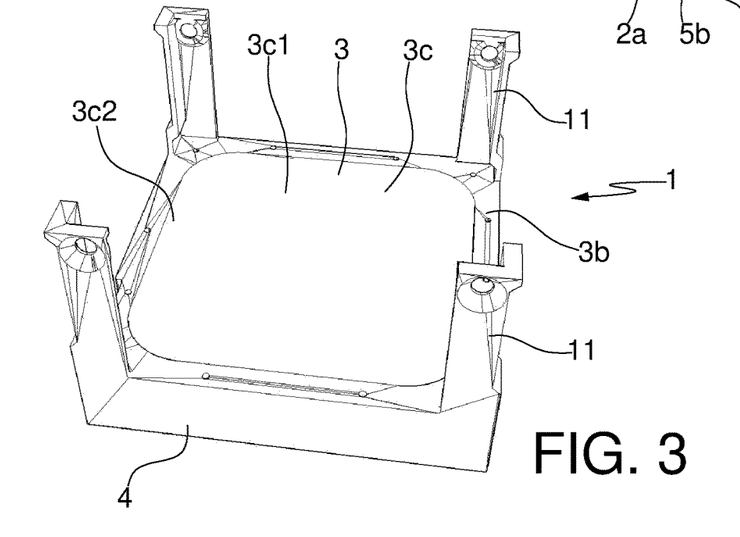
FIG. 3 is a perspective view slightly from above of the tank of FIG. 1.
Figure 4:
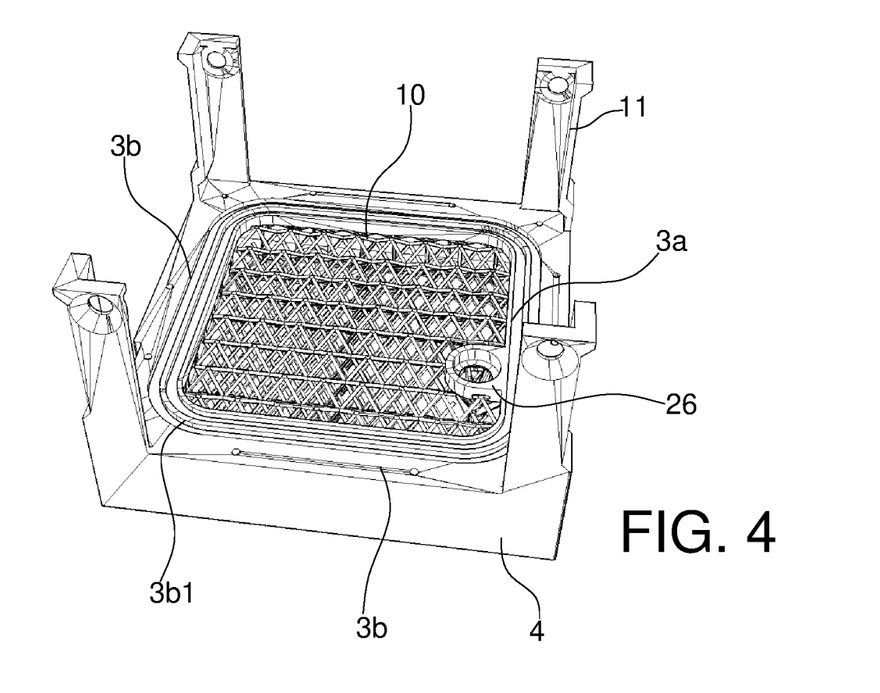
FIGS. 4 and 5 are perspective views slightly from above of a tank according to the present invention in an open configuration.
Figure 5:
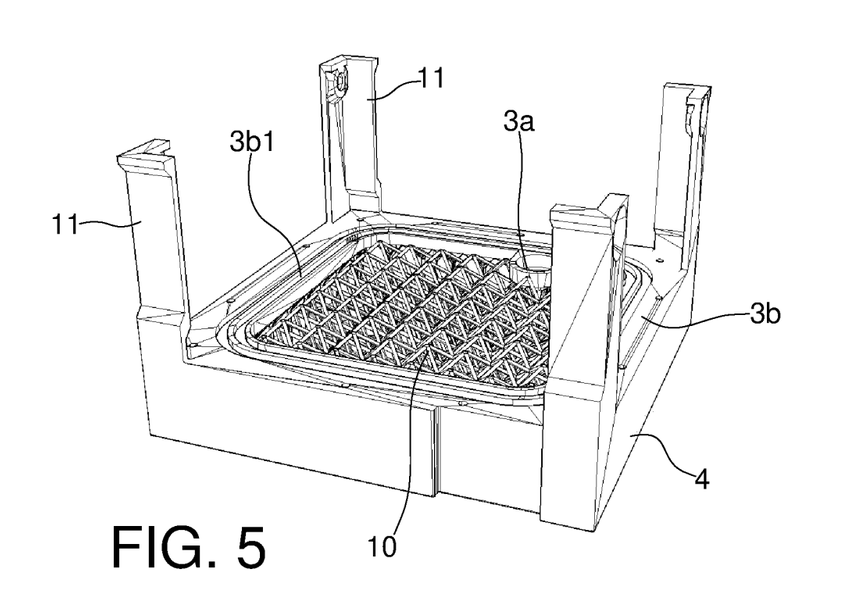
Figure 6:
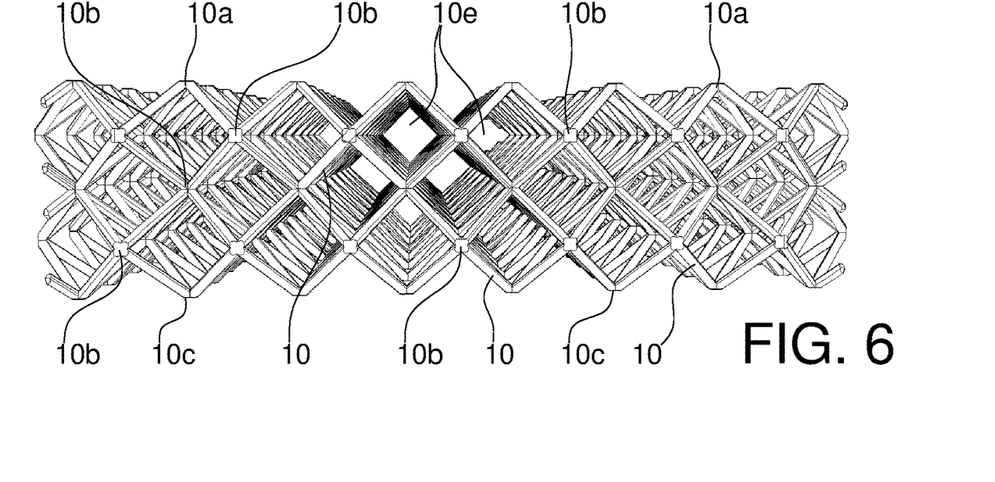
FIGS. 6, 7 and 8 illustrate details or components of the tank of FIG. 4.
Figure 7:
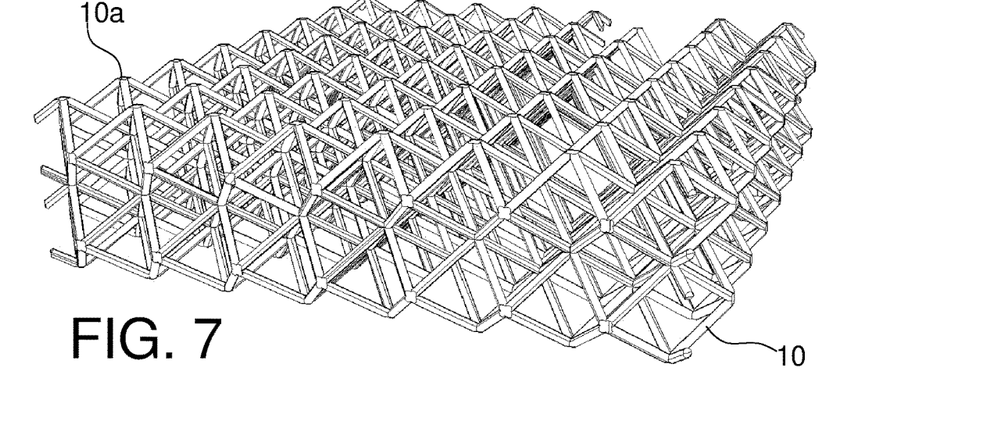
Figure 8:
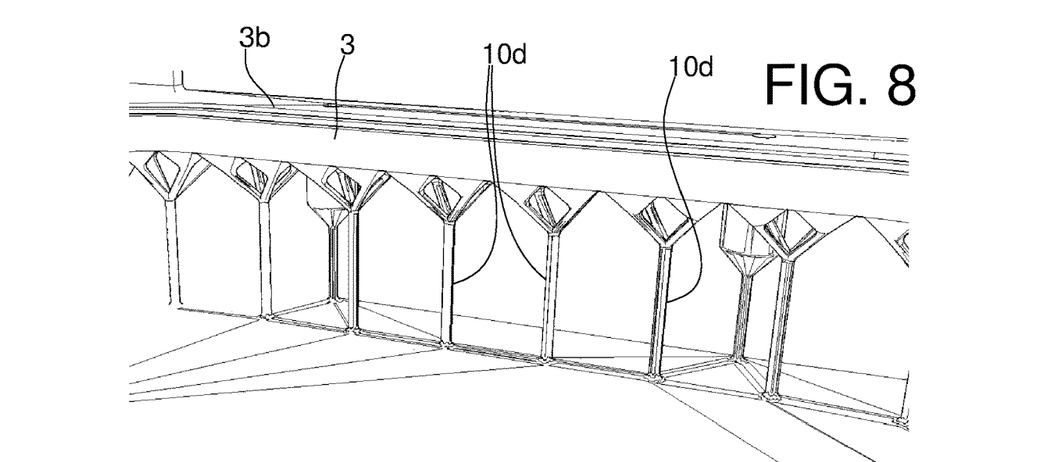
Figure 9:
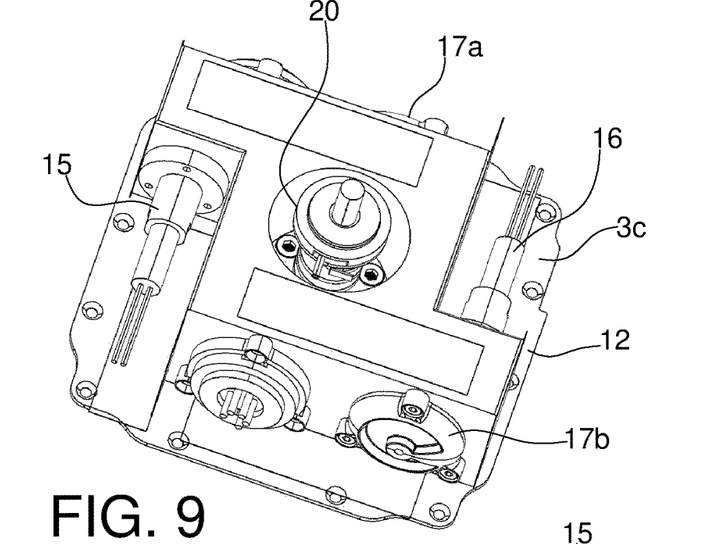
FIGS. 9, 10 and 11 are perspective views of a connecting component according to the present invention.
Figures 10, 11:
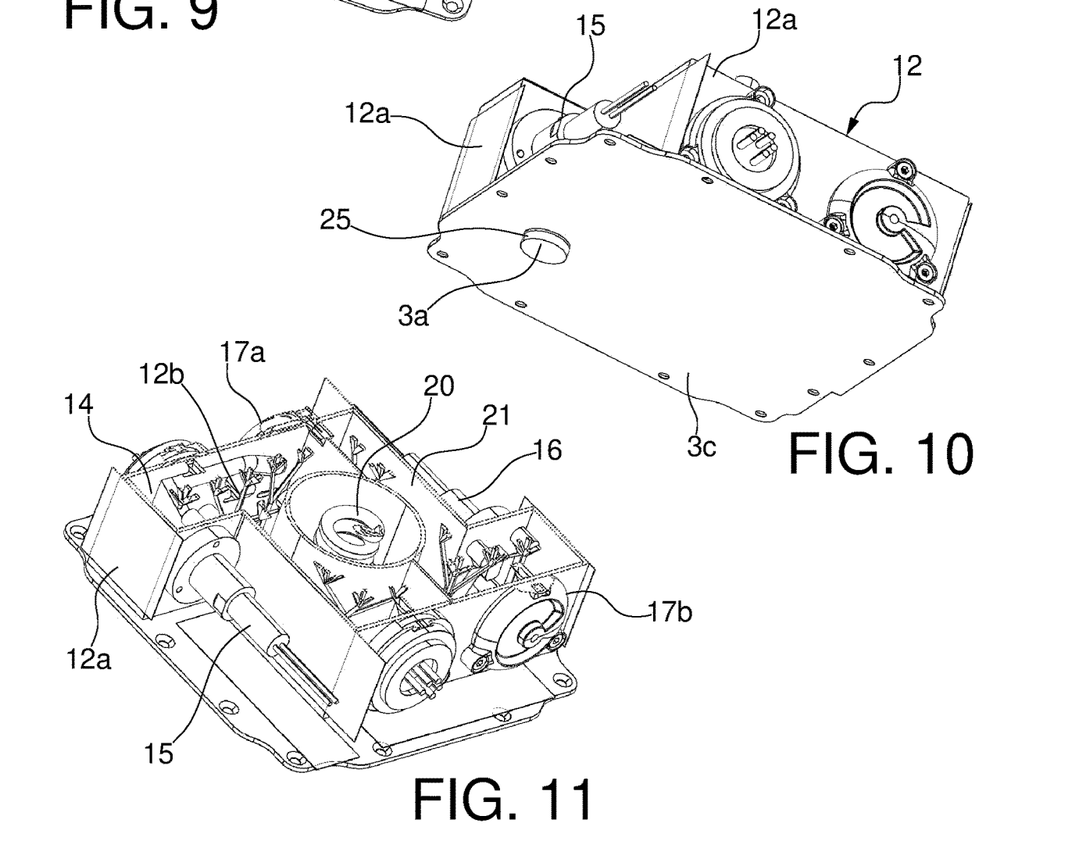

In accordance with the present invention, a connecting component or unit 12 of a tank containing a propellant is also provided (see in particular FIGS. 9 to 11), if desired a tank 1 with an engine 13, for example for the propulsion of an aerospace vehicle or means.

The connecting component 12 can comprise a buffer tank 14, a first opening/closing valve 15, a second opening/closing valve 16, a first pressure reducing component 17a and a second pressure reducing component 17b.

The connecting component 12 then comprises a first duct or line 18 upstream of the buffer tank 14 intercepted by the first opening/closing valve 15 and by the first pressure reducing component 17a, as well as a second duct or line 19 downstream of the buffer tank 14 and intercepted by the second opening/closing valve 16 and by the second pressure reducing component 17b.

The first 17a and/or the second 17b pressure reducing component can comprise a calibrated orifice, if desired with a respective filter.

If desired, the first opening/closing valve 15 is upstream of the first pressure reducing component 17a, while the second opening/closing valve 16 is downstream of the second pressure reducing component 17b.

The connecting component 12 can also comprise an auxiliary tank 21, for example smaller than the buffer tank 14, between the second pressure reducing component 17b and the second closing/opening valve 16 designed to guarantee a given starting flow rate of propellant.

The auxiliary tank 21 is to provide, in some operating phases, an overflow required, for example, in the starting phases of the engine.

If desired, the connecting component 12 could include heaters 22. Thus, for example, heaters, for example heating plates such as heating means 6, 7, can be applied to all the free surfaces of the connecting component 12.

The connecting component 12 can comprise a box-shaped body delimiting the buffer tank 14 and, if provided, the auxiliary tank 21, if desired to be separated by means of a special septum or membrane.

In this case, the removable lid part 3c of the second wall could constitute the bottom of the connecting component 12 with walls 12*a* delimiting the buffer tank 14 and, if provided, the auxiliary tank 21 rising therefrom.

The connecting component 12 can comprise reinforcing beam elements 12*b* of a respective closure wall 12*c* distal from the tank 1.

If desired, the connecting component 12 also includes a spiral injector 20 which puts the outlet of the connecting component 12 or the respective second duct or line 19 and a respective engine 13 in fluid communication.

Figure 12:
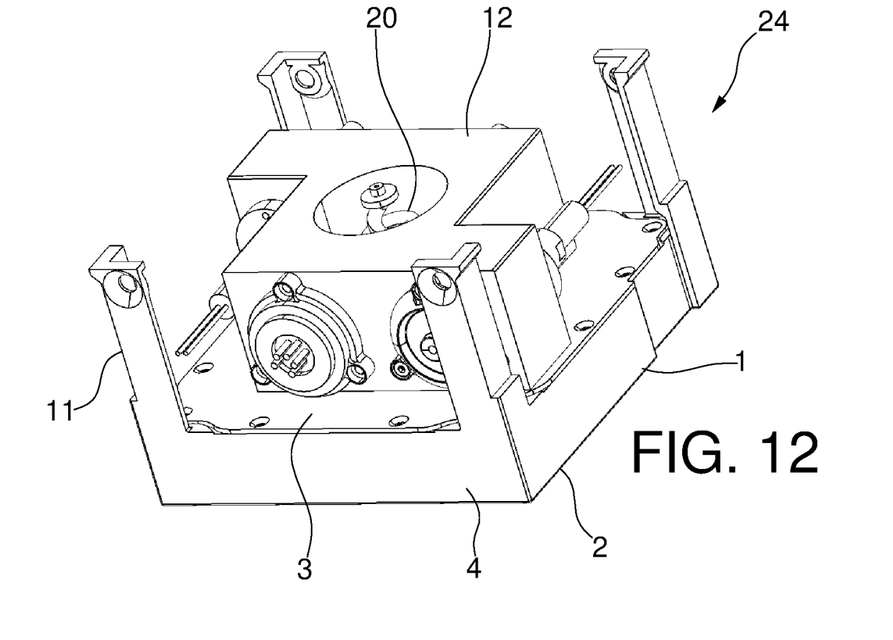
FIGS. 12 and 13 are perspective views of an engine supply unit according to the present invention.
Figure 13:
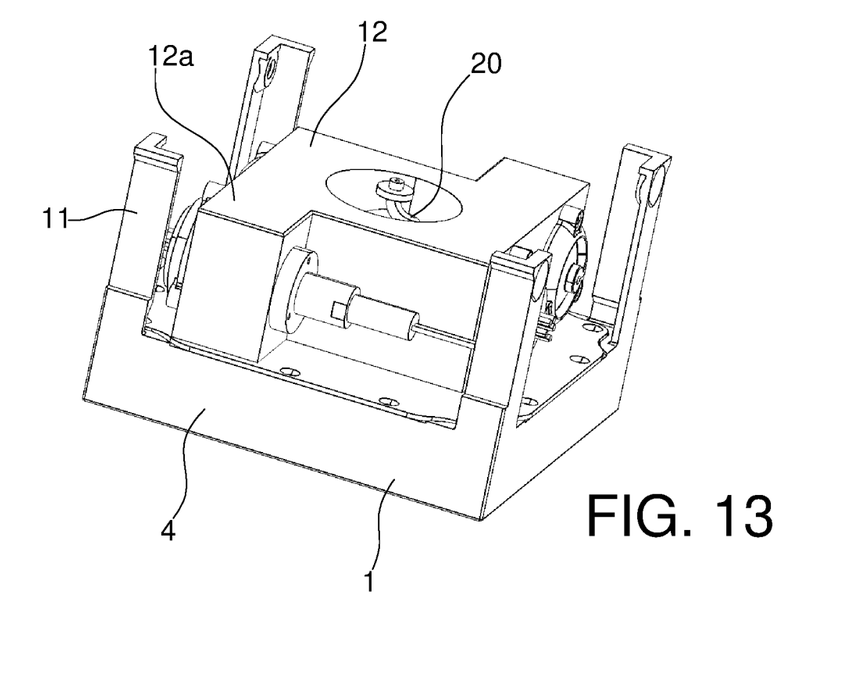
Figure 14:
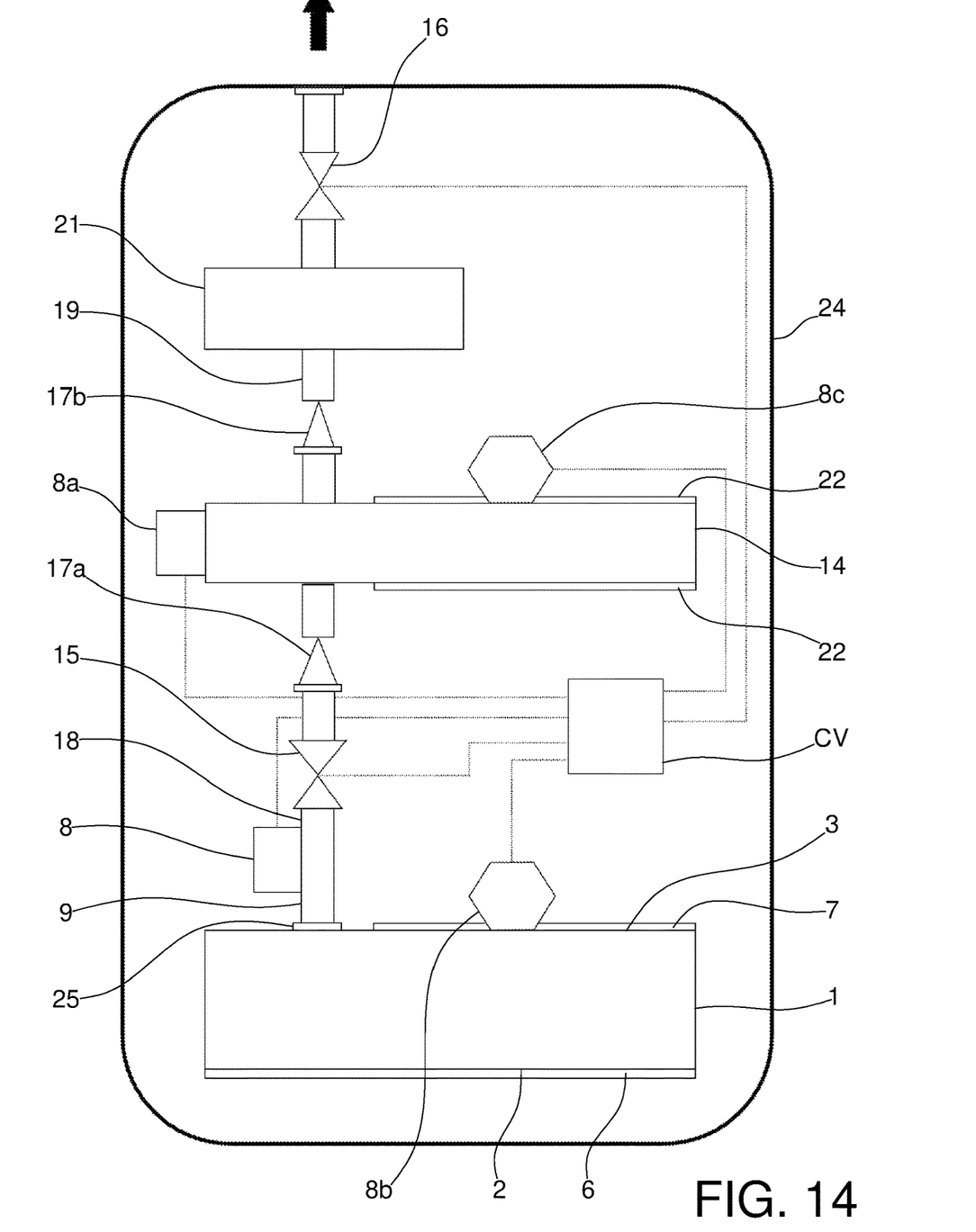
FIG. 14 is a schematic view of the unit of FIGS. 12 and 13.

A subject-matter of the present invention is also a supply unit or assembly 24 (see in particular FIGS. 12 to 14) of an engine comprising a tank 1 and a connecting component 12 mounted or assembled at the outlet 3*a* of the tank 1. Advantageously, a unit according to the present invention is designed to feed gas, for example iodine in the gaseous state to engines for the production of plasma for the supply of aerospace vehicles.

As indicated above, the connecting component 12 can actually also perform the task of lid for the tank 1 and, in this case, they 1, 12 share the removable lid part 3*c*. Alternatively, the tank 1 could have a respective cover of the second wall 3 released from the connecting component 12 or from any other fittings or ducts.

Moreover, the connecting component 12 can be arranged, in use, in the area defined by the uprights 11.

Clearly, the connecting component 12 could also be connected to the tank 1 in another manner.

As an alternative to a connecting component 12, a special valve could be provided, such as a proportional valve mounted on the outlet or on the outlet line from tank 1.

The first pressure reducing component 17*a* serves, in fact, to obtain a certain flow rate, since a specific pressure corresponds to a given flow rate, so that by imposing to the component 17*a* a pressure of the component fluid, it automatically establishes the flow rate of the latter.

The second opening/closing valve 16, on the other hand, constitutes a real switch of the supply unit 24.

With the structure described above, if an overpressure in the unit 24 occurs, this is managed by a so-called bang bang or low pass system, or through a proportional valve, or through direct discharge of the overpressure via a single valve (also an overpressure valve).

In this respect, as regards in particular the bang bang, if the propellant gas pressure, in a supply unit 24 of an engine comprising a tank 1 and a connecting component 12 mounted at the outlet 3*a* of the tank 1, is too high (depending on the needs or specifications of the engine), i.e. greater than a first threshold value, the unit 10 closes the first valve 15 and so the buffer tank 14 slowly empties, just that this would naturally occur according to a step transient and in this regard, the second pressure reducing component 17*b* serves to dampen the pressure peak.

If then the propellant gas pressure in the supply unit 24 is too low, i.e. less than a second threshold value (always according to the needs or specifications of the engine), or in any case the first valve 15 must be reopened, if the pressure of the tank 1 is high or greater than a respective threshold value, this would cause a high increase in the pressure of the buffer tank 14 and, in this case, the second reducing component 17*b* would reduce such a pressure.

In this regard, should the first opening/closing valve 15 be reopened, after it has been closed for a given period, in the event that there is a risk of too high pressure leaving the tank 1, the low pass or better the calibrated orifice 17*b* adjusts the pressure leaving the buffer tank 14 towards the engine 13, while when the pressure rises too high, the CU unit closes the valve 15 and then reopens it when the pressure is low again.

With reference to this aspect, the CU unit can comprise a controller means, such as a first pressure or mass flow rate sensor 8 on the first duct or line 18, for example upstream of the first open/close valve 15.

A second pressure sensor 8*a* mounted on the buffer tank 14 and designed to measure the pressure in the latter and to communicate it to the control unit CU can also be provided.

For the operation of the unit 24, the first valve 15 opens, so that the components of this unit fill with sublimated gas, in a manner such that when the unit 24 is in the expected supply conditions (flow rate), then the unit 10 opens the second valve 16.

The buffer tank 14, as indicated above, in combination with the second pressure reducing component 17*b* can play the role of damper, since it serves to dampen the pressure peaks that can derive from the tank 1.

The flow rate is then adjusted according to the pressure in the buffer tank 14 and from the passage section in the second pressure reducing component 17*b*.

The first opening/closing valve 15 and/or the second closing/opening valve 16 can comprise a so-called normally-closed valve.

The unit 24 can be equipped with devices to increase the accuracy of the flow rate control, such as for example proportional valves, heated capillary tubes, volumes controlled in PWM by pairs of valves, etcetera.

In a unit according to the present invention, the component fluid, such as iodine is kept in the gaseous state from the tank 1 to the engine 13, and clearly, if provided, also in a connecting component 12. In the tank 1, as above indicated, iodine can also be present in the solid stage and sublimate a little at a time.

In this regard, the temperature within the unit 24 is always increasing in the passage from the tank 1 to the engine 13, otherwise the component fluid, if desired, the iodine would re-condense, thereby clogging the orifices of unit 24.

The unit 24 can also comprise special filters, for example a filter 25 at the outlet from the tank 1 designed to prevent the solid component fluid from entering into the connecting component 12 at an inlet thereof, which, according to the embodiment illustrated in the figures also defines part of the outlet 3*a* of the component fluid from the tank 1, the other part of which can be defined on the bottom of the connecting component 12. The filter 25 could comprise a sintered disk in Inconel® or another material compatible with iodine or coated, such as for example titanium, gold, silver.

The filter 25 could be housed in a special seat 26 defined for example by the tank or by a section of wall extending from one of the walls 2, 3, 4 thereof.

If desired, the unit 24 is also equipped with temperature sensors, for example a first temperature sensor 8*b* designed to evaluate the temperature of the second wall 3 and/or a second temperature sensor 8*c* designed to evaluate the temperature of the connecting component or of a wall of the same.

One or each sensor 8, 8*a*, 8*b*, 8*c* is in electrical communication with the control unit CU.

Moreover, valves 15 and 16, if provided, are also in electrical communication with the control unit CU and controllable by the same.

The walls of the tank 1 and also of the connecting component 12 could be in a suitable resistant material, for example in nickel superalloy, if desired Inconel® 625, or in titanium or materials coated with gold or other compatible metals, for example silver.

Figure 15:
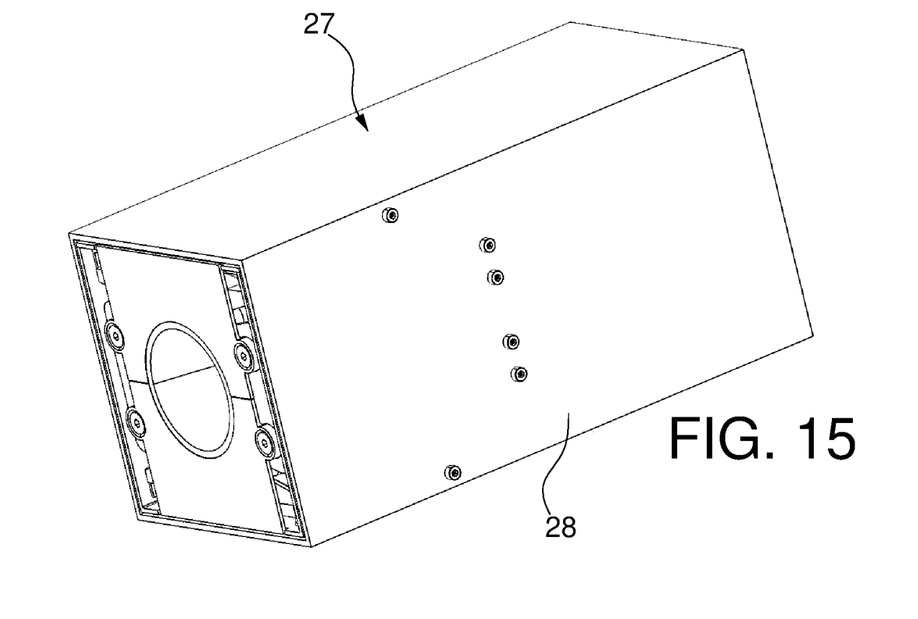
FIGS. 15 and 16 are perspective views of a propulsion group according to the present invention.
Figure 16:
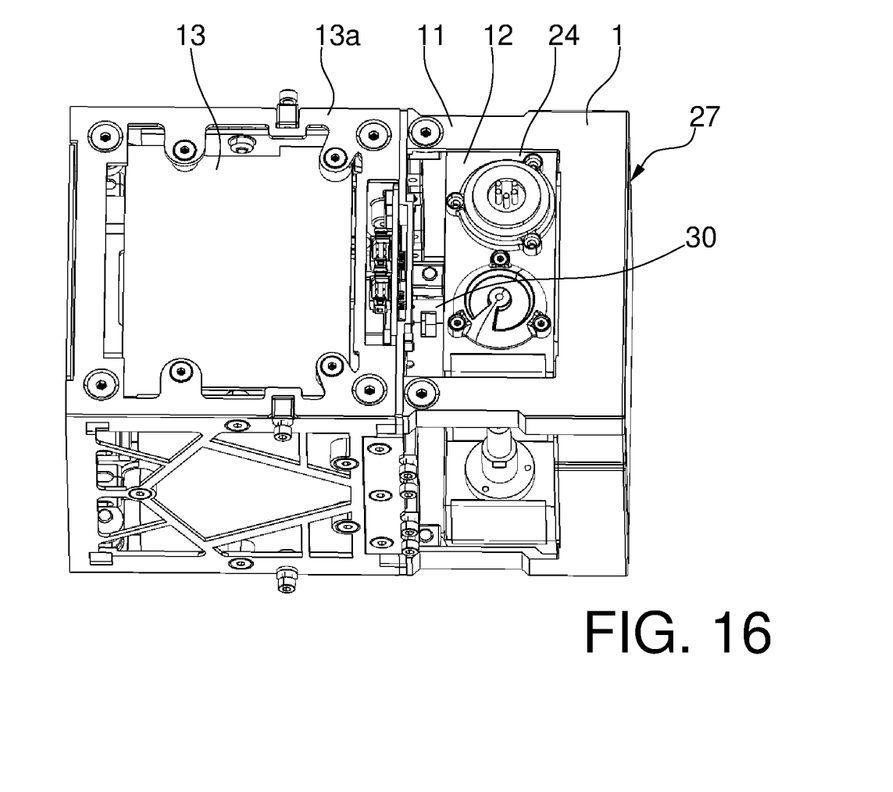

Subject-matter of the present invention is also a propulsion group or engine 27 (see in particular FIGS. 15 and 16) of a vehicle, such as an aerospace vehicle, which comprises a unit 24 as well as an engine 13 in fluid communication with the outlet of the connecting component 12, for example connected by means of a special transfer duct 30 of the gas or propellant from the unit 24 to the engine 13. An engine according to the present invention is designed to produce plasma for supplying aerospace vehicles starting from a gas, for example starting from iodine in the gaseous state.

An engine according to the present invention or which can be powered by a tank or a unit in accordance with the present invention could for example be the subject-matter of the international application published under the number WO2016113707A1.

If desired, the uprights 11 are screwed to the frame 13a of the engine 13.

The external faces of the unit 24 or the external walls 28 of the propulsion group 27 can be suitably treated so as to isolate them properly, although a sufficient temperature passage towards the outside must be guaranteed, so that the propulsion group 27, if necessary, can be cooled more or less quickly.

In accordance with the present invention, a method for controlling the flow rate leaving from a tank 1 or from a supply unit 24 is also provided, according to which the flow rate of the component fluid leaving the tank 1 is detected directly or indirectly, and, if this flow rate is not in a predetermined range, then a control unit CU acts on the heating means 6, 7 so as to increase or decrease the temperature difference between the first wall 2 and the second wall 3.

Advantageously, the control unit CU sets the heating means 7 so as to have a temperature at the second wall 3 which is very high or in any case much higher than the first wall 2, and therefore acts on the heating means 6 to raise or lower the temperature of the first wall 2 to consequently adjust, if necessary, the flow rate of component fluid leaving the tank 1.

Clearly, what has been described with respect to tank 1 and unit 24 or better to their operation, it is applied to a method in accordance with the present invention.

Similar reasoning applies with reference to the management of an over pressure in the unit 24 by means of a so-called bang bang or low pass system.

As will be appreciated, the present invention generally relates to the adjustment of the flow rate of a component fluid, advantageously iodine leaving a tank 1.

The component fluid, such as iodine, is heated in order to have a solid phase and a vapor or gas phase in the tank 1.

The opening of a valve, if desired the first open/close valve 15, allows the delivery of iodine in the vapor phase to the users, for example a propulsion system, such as an engine 13.

The thermal dynamics of the system is very complex because, as indicated above, solid iodine acts as an insulator and tends to heat up only when it is in contact with hot surfaces, while remaining cold in the core or in the central part.

Moreover, if the system is to operate in the absence of gravity, it is plausible to expect that solid iodine will detach from the hot walls by floating in a vacuum, resulting in an extremely complex system dynamic. As indicated above, usually in systems or iodine tanks it is heated in such a way as to have sufficient pressure, then adjusting the leaving mass flow rate through a flow regulation system.

On the other hand, a tank according to the present invention comprises two parts, a second wall 3 placed at a high temperature with respect to the condensation temperature of the iodine, which has the purpose of not providing a condensation surface and a first wall 2, if desired equipped with lamellae or projections placed at the iodine fine control temperature set so as to allow a precise thermal control of the solidification of the same.

The possible presence of the lamellae 10 allows to increase the surface-volume ratio and therefore allows to warm the iodine deeply and in a uniform way and, at the same time, ensures that, in case of floating of the pieces of iodine, no pieces of iodine too far from hot surfaces are to be found.

Thanks to these measures, a precise iodine thermal control is obtained without the need for additional external control devices.

A direct or indirect measurement of the flow rate of the component fluid leaving the tank 1 is satisfactory to obtain a feedback control of the temperature of the first wall 2.

Clearly, the presence of a mass flow rate meter would increase the accuracy of the system, while increasing its costs.

If further external flow control is required, in any case the present invention would make it possible to substantially reduce the control authority required by such control.

Basically, the output gas flow rate is obtained, without the need to use active control elements, such as for example actively controlled valves, but only through the fine control of the tank temperature and the measurement of parameters, such as pressure or mass.

Changes and variations of the invention are possible within the scope defined by the claims.

The invention claimed is:

1. A tank for containing a component fluid or a mixture of components, said tank comprising a first wall portion, a second wall portion, said first and second wall portions delimiting at least one housing area of said component fluid or mixture of components, first heating means of said first wall portion and second heating means of said second wall portion, at least one controller means of the flow rate of said component fluid leaving said tank, a control unit (CU) designed to operate said heating means so as to maintain said first wall portion at a temperature lower than said second wall portion, said control unit (CU) being designed to receive the signals of said controller means and to consequently control said first and second heating means so as to increase, decrease or keep constant the temperature difference between said first wall portion and said second wall portion according to whether the flow rate of said component fluid evaluated or obtained by said control unit (CU) as a function of the signals received by said at least one controller means is respectively less than, greater than or equal to a given value or range of values.

2. The tank according to claim 1, wherein said at least one control unit (CU) is designed to set said second heating means so as to have a temperature at the second wall portion higher than the temperature at the first wall portion and is therefore designed to act on the first heating means to raise or lower the temperature of the first wall portion to consequently adjust, if necessary, the flow rate of component fluid leaving the tank.

3. The tank according to claim 1, wherein said flow rate of said first component leaving the tank is controlled only thanks to the action of the heating means.

4. The tank according to claim 1, wherein said at least one controller means comprises a sensor designed to directly or indirectly detect the flow rate of said first component leaving the said tank.

5. The tank according to claim 4, wherein said at least one controller means comprises at least one pressure or temperature sensor.

6. The tank according to claim 1, for containing a liquid, solid or gaseous propellant fluid for engines.

7. The tank according to claim 6, for the supply of gas to engines for the production of plasma, if desired to supply an aerospace vehicle.

8. The tank according to claim 6, wherein said propellant fluid comprises iodine.

9. The tank according to claim 1, comprising homogenization means of the temperature in said at least one housing area, said homogenization means being designed to improve the transfer of thermal energy between said first wall portion and the component fluid contained in the housing area.

10. The tank according to claim 9, wherein said temperature homogenization means comprise lamellae, projections, thermal contactors or protrusions distributed within said at least one housing area.

11. The tank according to claim 10, wherein said lamellae or protrusions extend or are in a single piece with said first wall portion.

12. The tank according to claim 10, wherein said lamellae or protrusions are not in contact with said second wall portion or in any case are in contact with an area of said second wall portion of less than 10%, 20% or 30% of the extension of the same or of a respective internal face.

13. The tank according to claim 9, wherein said lamellae or protrusions are distributed along a lattice or latex structure.

14. A supply unit of an engine comprising a tank according to claim 1 and a connecting component or unit mounted at the outlet of said tank, said connection unit or component comprising a buffer tank, a first opening/closing valve, a second opening/closing valve, a first pressure reducing component and a second pressure reducing component, a first duct or line upstream of said buffer tank intercepted by said first opening/closing valve and from said first pressure reducing component, as well as a second duct or line downstream of said buffer tank and intercepted by said second opening/closing valve and by said second pressure reducing component.

15. The connecting component or unit according to claim 14, wherein said first and/or said second pressure reducing component comprise a calibrated orifice.

16. The connecting component or unit according to claim 14, comprising an auxiliary tank between said second pressure reducing component and said second closing/opening valve designed to guarantee a determined initial flow rate of propellant.

17. The unit according to claim 14, wherein part of said second wall portion constitutes the bottom of the connecting component, with walls delimiting the buffer tank rising therefrom.

18. A propulsion group of a vehicle comprising a unit according to claim 14 as well as an engine in fluid communication with the outlet of said connecting component.

19. A method for controlling the supply unit according to claim 14, wherein if the propellant gas pressure of the supply unit is higher than a threshold value, the control unit (CU) closes the first opening/closing valve and thus the buffer tank, the second pressure reducing component damping the pressure peak, while if the propellant gas pressure of the supply unit is lower than a threshold value or in any case the first valve must be reopened, if the pressure of the tank is higher than a threshold value, the second pressure reducing component would reduce such pressure.

20. A method for controlling the flow rate leaving from a tank according to claim 1, comprising the following steps:
   detecting the flow rate of the component fluid leaving the tank,
   if this flow rate is not in a predetermined range then said control unit (CU) acts on the first and second heating means so as to increase or decrease the temperature difference between the first wall portion and the second wall portion.

21. The method according to claim 20, wherein said control unit (CU) sets the second heating means so as to have a temperature at the second wall portion higher than the first wall portion and therefore acts on the first heating means to raise or lower the temperature of the first wall portion to consequently adjust, if necessary, the flow rate of component fluid leaving the tank.

* * * * *